May 12, 1959
W. S. HINMAN, JR
2,886,621
SEQUENTIAL FILLED RESERVE BATTERY
Filed April 9, 1951
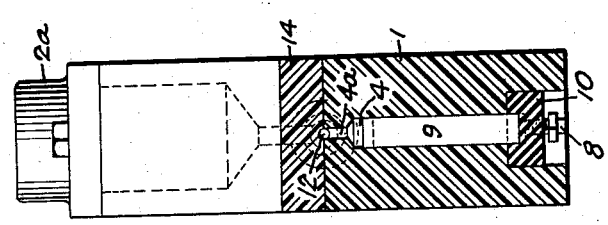
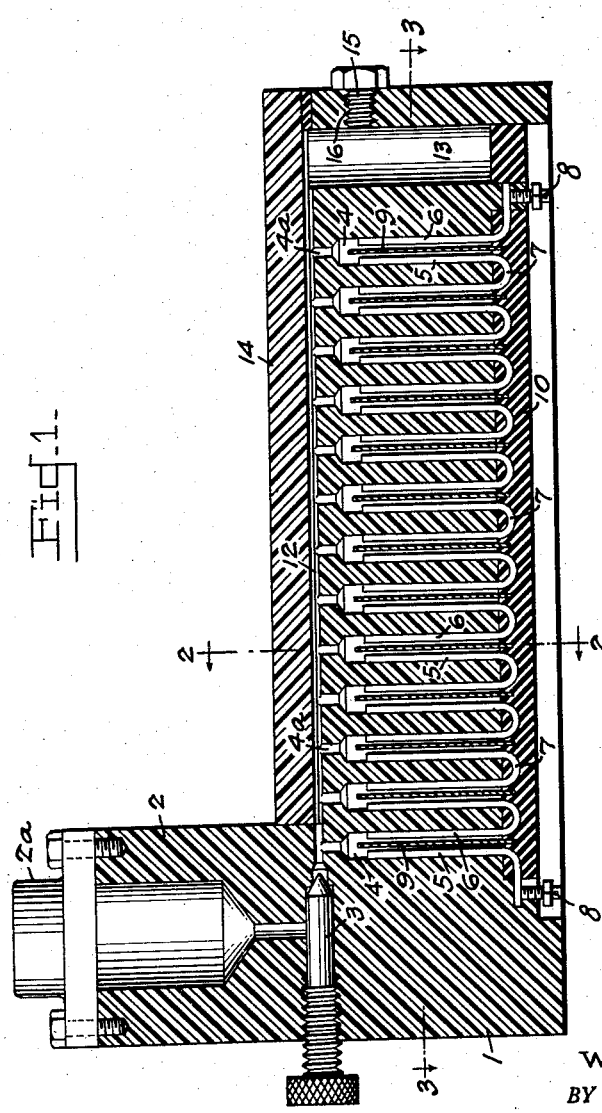
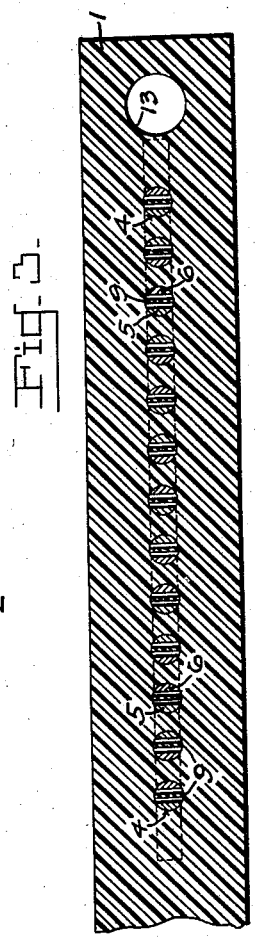
INVENTOR.
Wilbur S. Hinman, Jr.
BY
G. J. Kessenich + A. W. Dew
ATTORNEYS

United States Patent Office 2,886,621
Patented May 12, 1959

2,886,621

SEQUENTIAL FILLED RESERVE BATTERY

Wilbur S. Hinman, Jr., Falls Church, Va., assignor to the United States of America as represented by the Secretary of the Army Application April 9, 1951, Serial No. 220,122

1 Claim. (Cl. 136—90)

(Granted under Title 35, U.S. Code (1952), sec. 266)

The invention described in the specification and claim may be manufactured and used by or for the Government for governmental purposes without the payment to me of any royalty thereon.

This invention relates to reserve type batteries and especially to reserve type batteries for military use.

When such batteries are to be stored for a long period before being put into service, it is customary to maintain storage with the plates of the battery or cell dry, and to introduce the electrolyte at, or shortly prior to, the instant the cell or battery is to be put into service.

In the case of a single cell, this action is not difficult to achieve, but where a number of cells are connected in series to form a battery, the problems of rapid filling of the cells and of preventing the electrolyte from forming inter-cell short circuits have been consistently difficult of solution.

An object of the invention is a series-cell battery of the reserve type in which electrolyte is introduced sequentially into the various cells, and in which the superfluous electrolyte is removed from a position in which the possibility of causing inter-cell short circuits would occur.

The specific nature of the invention as well as other objects and advantages thereof will clearly appear from the following description and accompanying drawings in which:

Figure 1 is a longitudinal sectional view of the battery of the invention.

Figure 2 is a sectional view taken along the line 2—2 of Fig. 1.

Figure 3 is a sectional view taken along the line 3—3 of Fig. 1.

Figure 1 of the drawings, shows an embodiment of the battery of the invention which comprises a block 1 of plastic, hard rubber, or other suitable insulating material having formed therein a reservoir 2 containing an electrolyte under pressure (not shown), a surplus electrolyte receiving chamber 13, a series of cell chambers 4 and a passageway 12 connecting the reservoir and chambers. A valve 3, such as a needle valve, is located in the block between one end of the passageway and the reservoir to admit electrolyte to the cells at the desired time. Valve means for filling the reservoir and for maintaining the electrolyte under pressure is indicated by the reference numeral 2a.

The cells consist of chambers 4 having positive and negative plates, 5 and 6 respectively, inserted therein. Plates 5 and 6 may be composed of any kind of metal commonly used in the battery art and may be strips of the same material as shown. Each cell is connected by means of suitable connectors 7. The battery terminals are indicated by reference numeral 8. A paper separator 9, or any suitable means, is used within each cell to maintain separation between the positive and negative plates. The ends of the cells, through which the plates are inserted, are closed by means of a bottom member 10, of suitable insulating material, cemented or otherwise fixed in place so as to provide a gas tight joint. The other end of each cell is formed with an orifice 4a which connects with a passageway 12. This passageway communicates at one end with the valve 3, and at its other end with an electrolyte receiving chamber 13. The passageway is formed by a groove in block 1 and a corresponding groove in the cover plate 14 which is cemented to the block so as to form a gas tight seal. A threaded plug 15 in a port 16, formed in the wall of the chamber 13, is provided to seal chambers 4 and 13 and passageway 12 when this portion of the assembly has been evacuated.

In the manufacture of the battery, the cells are assembled with plates and connections as previously described and the assembly sealed. The needle valve 3 is closed, and the assembly is evacuated through port 16 which is subsequently sealed by means of plug 15. The higher the degree of evacuation, the better the filling operation will be performed.

The reservoir 2 is filled with a measured quantity of electrolyte and maintained therein under a relatively high pressure. When the valve 3 is opened, it permits the flow of electrolyte into the adjacent end of passageway 12 and thence into the first cell; when that cell is filled, additional electrolyte travels further along passageway 12 to the orifice of the second cell, which is then filled. This action is repeated for each cell until the most remote cell has been filled. Any superfluous electrolyte flows into chamber 13, the passageway 12 being blown free of any residual electrolyte by the compressed gas which supplied the pressure on the electrolyte. This cleaning of the electrolyte from the passageway 12 prevents short circuits between the various cells of the battery. The action of cleaning the electrolyte from the passageway will be facilitated by employing a water-repellant or non-wetting type of material in at least this area.

I claim:

A high voltage compact reserve type battery comprising: a gas tight block having first and second chambers at opposite ends therein and a single, continuous and substantially horizontal groove in said block providing a passageway between said first and second chambers, said first chamber being above said groove while said second chamber is below said groove, valve means interposed between said first chamber and adjacent one end of said groove to provide gas tight isolation between said first chamber and the remainder of said block, a measured quantity of liquid electrolyte under gas pressure arranged in said first chamber so that said electrolyte will be forced out of said first chamber into said groove when said valve means are opened, a plurality of substantially vertical series-connected wet cells formed in said block below said groove and between said first and second chambers, each of said cells having positive and negative plates; and an electrolyte receiving chamber, each receiving chamber being closed at one end and tapered at the opposite end to form an orifice of reduced cross section, said orifice communicating with said groove so that electrolyte entering said groove from said first chamber sequentially fills said receiving chambers through their orifices, said second chamber receiving electrolyte last, said groove, receiving chambers and second chamber being under vacuum until activation, said battery being activated by opening said valve to cause electrolyte from said first chamber to enter said groove under pressure thereby filling said receiving chambers through said orifices, the gas pressure expelling into said second chamber any superfluous electrolyte remaining in said groove and said first chamber after said receiving chambers have been filled.

References Cited in the file of this patent

UNITED STATES PATENTS

| | | |
|---|---|---|
| 254,676 | Michaud | Mar. 7, 1882 |
| 592,782 | Hess | Nov. 2, 1897 |
| 651,247 | Hess | June 5, 1900 |
| 2,441,896 | Moir | May 18, 1948 |
| 2,594,879 | Davis | Apr. 29, 1952 |